(12) United States Patent
Larson

(10) Patent No.: US 7,322,638 B2
(45) Date of Patent: Jan. 29, 2008

(54) SPOILER FOR A MOTOR VEHICLE

(75) Inventor: Grant Larson, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/453,198

(22) Filed: Jun. 15, 2006

(65) Prior Publication Data
US 2007/0001482 A1 Jan. 4, 2007

(30) Foreign Application Priority Data
Jun. 29, 2005 (DE) ...................... 10 2005 030 203

(51) Int. Cl.
B62D 35/00 (2006.01)
(52) U.S. Cl. ................. 296/180.5; 296/26.12; 296/180.1; 180/903
(58) Field of Classification Search ............. 296/26.01, 296/26.12, 26.13, 180.1, 180.2, 180.3, 180.4, 296/180.5; 244/213; 105/1.3; 180/903
See application file for complete search history.

(56) References Cited

U.S. PATENT DOCUMENTS

| 1,274,986 | A | * | 8/1918 | Carolin | 244/213 |
| 1,762,002 | A | * | 6/1930 | Van De Putte | 244/213 |
| 3,791,468 | A | * | 2/1974 | Bryan, Jr. | 180/69.2 |
| 4,773,692 | A | * | 9/1988 | Schleicher et al. | 296/180.5 |
| 4,925,236 | A | * | 5/1990 | Itoh et al. | 296/180.5 |
| 5,013,081 | A | * | 5/1991 | Cronce et al. | 296/180.1 |
| 5,120,105 | A | * | 6/1992 | Brin et al. | 296/180.5 |
| 5,536,062 | A | * | 7/1996 | Spears | 296/180.3 |
| 6,672,651 | B1 | * | 1/2004 | Shuen | 296/180.5 |
| 2002/0074826 | A1 | * | 6/2002 | Presley | 296/180.1 |

FOREIGN PATENT DOCUMENTS

| DE | 1 505 212 | * | 5/1969 | 296/78.1 |
| DE | 30 19 150 C2 | | 7/1988 | |
| DE | 43 05 090 C2 | | 4/1995 | |
| DE | 197 41 321 A1 | | 12/1998 | |
| DE | 10 2004 030 571 A1 | | 1/2006 | |
| EP | 271757 A2 | * | 6/1988 | 244/46 |
| JP | 60163773 A | * | 8/1985 | 296/180.5 |
| JP | 03000578 A | * | 1/1991 | 296/180.1 |
| JP | 03281484 A | * | 12/1991 | 296/180.1 |

* cited by examiner

Primary Examiner—Dennis H. Pedder
Assistant Examiner—Paul Chenevert
(74) Attorney, Agent, or Firm—Crowell & Moring LLP

(57) ABSTRACT

A spoiler for a motor vehicle, in particular a passenger vehicle, is mounted in the rear-end area on the vehicle and comprises a spoiler element which is movable from a resting position in which it is integrated into the shape of the rear-end area and into an extended operating position. To further improve upon the aerodynamic properties of the spoiler in particular the downward pressure on the rear axle, the spoiler element has a greater transverse extent in the extended operating position than in the retracted resting position.

8 Claims, 3 Drawing Sheets

SPOILER FOR A MOTOR VEHICLE

This application claims the priority of German application No. DE 10 2005 030203.3, filed Jun. 29, 2005, the disclosure of which is expressly incorporated by reference herein.

BACKGROUND AND SUMMARY OF THE INVENTION

The present invention relates to a spoiler for a motor vehicle, in particular a moveable spoiler for a passenger vehicle.

German Patent DE 30 19 150 C2 describes a spoiler for a motor vehicle, in particular for a passenger vehicle, situated in an upper rear-end area of the vehicle and comprising a spoiler element which can be shifted from a resting position, in which it is integrated into the shape of the rear-end area so that it is flush with the surface, into an extended operating position.

With this arrangement, the spoiler is formed by an inverted one-piece airfoil wing, which can be moved by means of an operating device from the resting into the operating position and vice versa.

German Patent DE 43 05 090 C2 discloses a spoiler for a motor vehicle which is located in the rear-end area of the vehicle and comprises a spoiler element that can be shifted from a resting position into an extended operating position. The spoiler element is formed by a rear spoiler arranged in a recessed receptacle of the vehicle body and movable by an operating device from a retracted resting position in which it is approximately flush with the surface of the adjacent vehicle body into an extended operating position.

The one-piece spoiler element has the same transverse extent in the resting position and in the extended operating position. The aerodynamic drag coefficient of the vehicle (cw value) is improved with the spoilers described above and a downward pressure on the rear axle is created.

The object of the present invention is to improve upon a spoiler of the generic type defined in the preamble so that the aerodynamic properties of the vehicle, in particular the downward pressure on the rear axle, are further improved.

The main advantages achieved with the present invention may be regarded as the fact that the effective aerodynamic oncoming flow area is increased in operating position D by increasing the size of the spoiler in the transverse direction of the vehicle, thereby further increasing in particular the downward pressure on the rear axle when the vehicle is being driven. The spoiler then also extends on both sides of the central part of the body in the area of the side parts and/or the fenders of the vehicle in operating position D.

Other objects, advantages and novel features of the present invention will become apparent from the following detailed description of the invention when considered in conjunction with the accompanying drawings for example.

DETAILED DESCRIPTION

Figure 1:
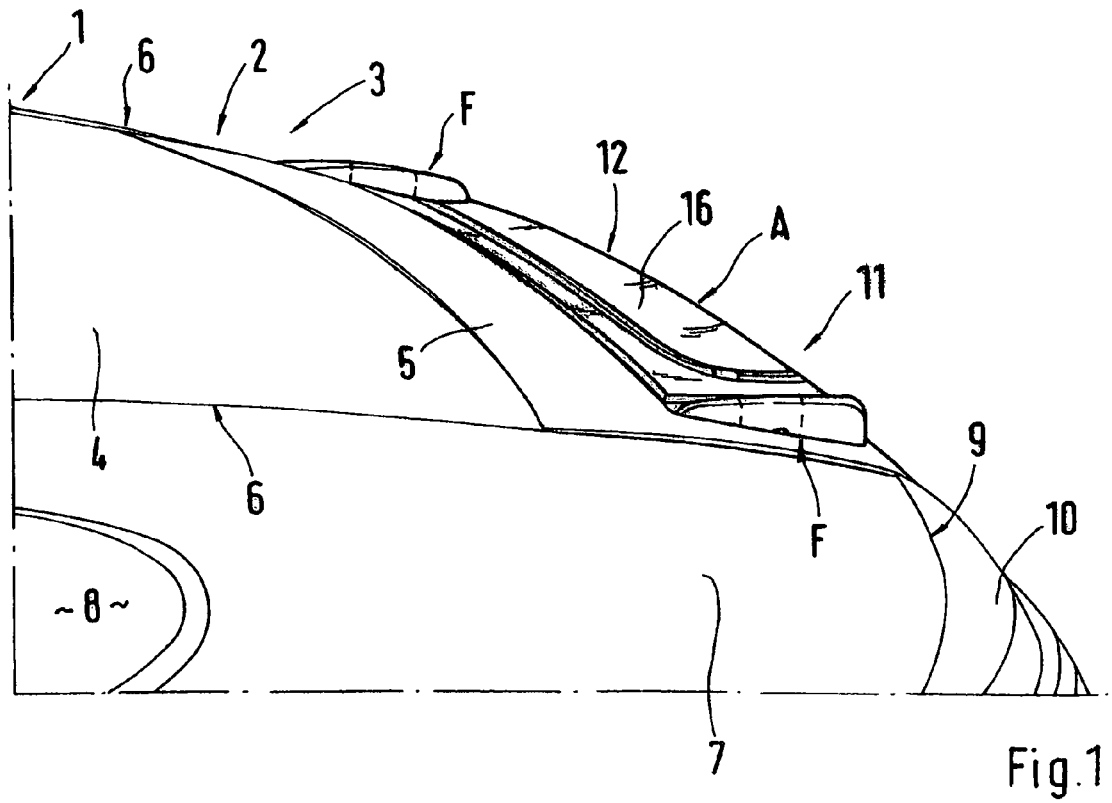
FIG. 1 shows a perspective view obliquely from above of a rear-end area of a vehicle having a spoiler, whereby a spoiler element in accordance with an embodiment of the present invention assumes a retracted resting position A.

A passenger vehicle 1 includes a vehicle body 2 which has a large windshield 4 in the rear-end area 3 shown here and a body part 5 behind that. The rear windshield 4 and the body part 5 are each bordered on the two longitudinal sides 6 by a rear side part 7 in which a rear side window 8 is provided. A light unit 10 running transversely is connected to the rear end 9 of the side part 7. The body part 5 and the rear windshield 4 may be designed separately from one another, but they may also be combined to form a joint structural unit mounted pivotably on the vehicle body 2, for example. In the exemplary embodiment shown here, the body part 5 is formed by an engine cover on the rear end.

Figure 2:
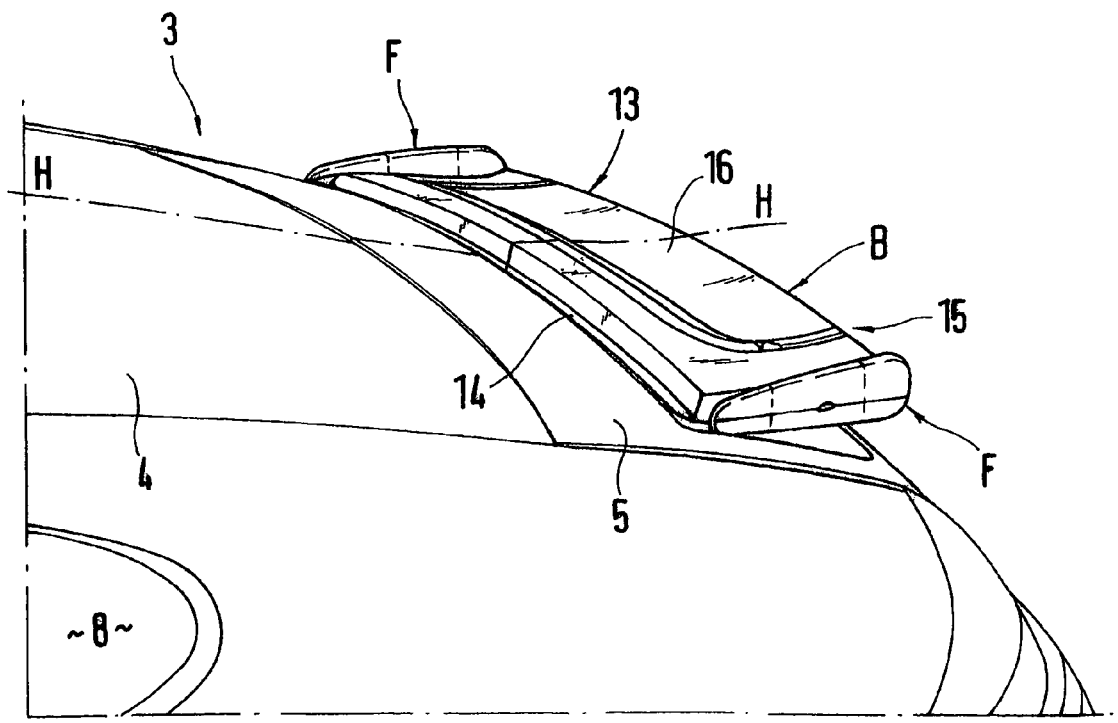
FIG. 2 shows a view according to that shown in FIG. 1, whereby the spoiler element assumes a raised intermediate position B.

A spoiler 11 including a spoiler element 12 that cooperates with an operating device (not shown here) that is provided on the rear end body part 5 of the rear-end area 3 designed in the manner of a fastback. The spoiler element 12 is movable by means of the operating device from a resting position A, in which it is integrated into the shape of the rear-end area 3 to be approximately flush with the surface, to an extended operating position D by way of intermediate positions B, C and vice versa. In the resting position A, the spoiler element 12 is accommodated in a countersunk receptacle of the rear end body part 5, the top side of the spoiler element 12 running approximately flush with the surface of the adjacent body contour. The spoiler element 12 in the exemplary embodiment is formed by a rear spoiler 13 which can be pivoted outward and is connected with an articulated connection to the adjacent body part 5 on its forward end 14 with the help of at least one hinge (not shown here). The rear end 15 of the rear spoiler 13 is pivoted upward when the spoiler 11 is extended (FIG. 2).

However, the movable spoiler element 12 could also be formed by an inverted airfoil wing profile (not shown here).

According to this invention, the spoiler element 12 in the extended operating position D has a greater transverse extent than in the retracted resting position A. This is achieved by the fact that the movable spoiler element 12 is designed in multiple parts—as seen in the transverse direction of the vehicle E-E—with at least individual parts of the spoiler device 12 being designed to be movable in the transverse direction E-E of the vehicle.

Figure 3:
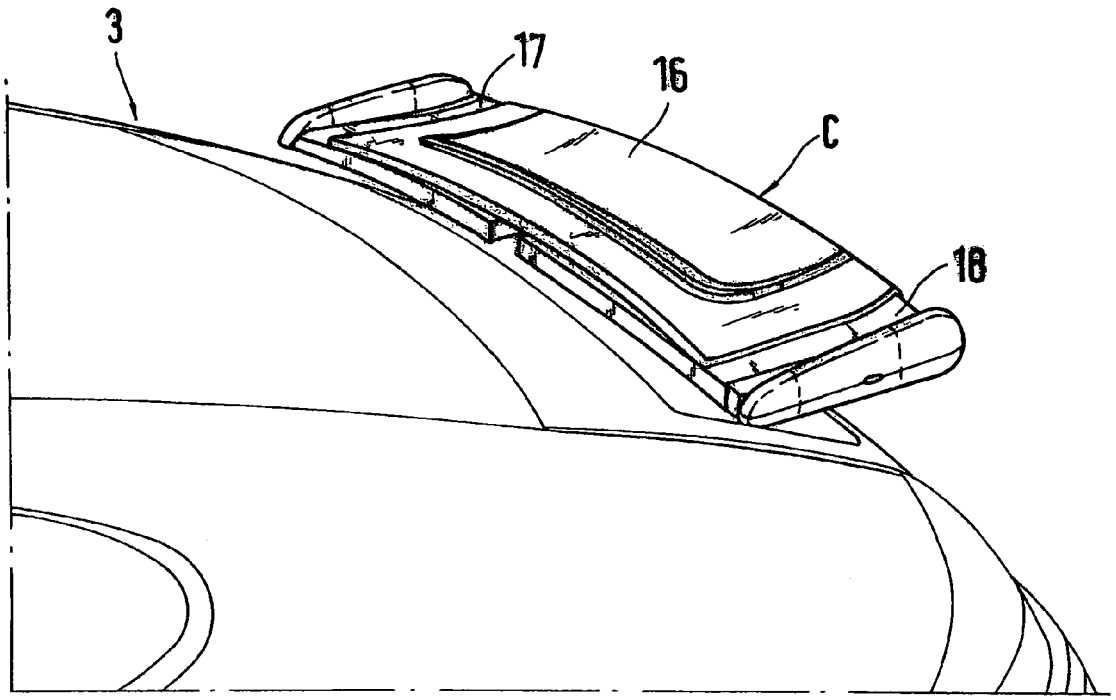
FIG. 3 shows a view according to that shown in FIG. 2 whereby the spoiler element assumes a partially extended intermediate position C in the transverse direction.
Figure 4:
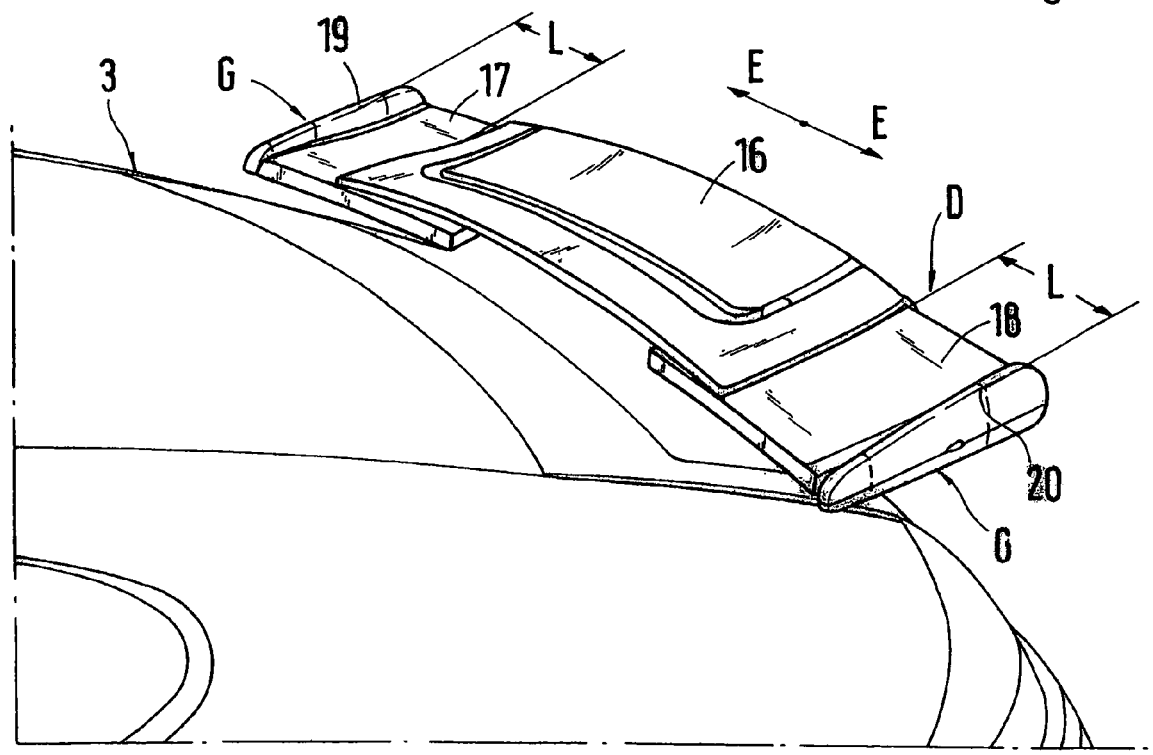
FIG. 4 shows a view according to that shown in FIG. 2 in the completely extended operating position D of the spoiler element.

According to a first embodiment, the spoiler element 12 has a relatively wide central part 16 and two definitely narrower side extension parts 17, 18 that are on the outside, whereby the two side extension parts 17, 18 are movable in the transverse direction E-E of the vehicle with respect to the central part 16. In the retracted resting position A of the spoiler element 12, the two side extension parts 17, 18 are inserted into the wider central part 16 in at least some areas. In the exemplary embodiment, the side extension parts 17, 18 have upright bordering webs 19, 20 running in the longitudinal direction of the vehicle on their outer ends, these bordering webs protruding upward beyond the top side of the rear spoiler 13. The side extension parts 17, 18 are movable by means of a drive device (not shown) from their retracted end position F (FIG. 1 and FIG. 2) into their extended end position G (FIG. 4) via a telescoping shifting movement or a flipping movement. This adjusting movement of the side extension part 17, 18 in the transverse direction of the vehicle takes place only when the complete spoiler element 12 has been moved from the retracted resting position A into a raised intermediate position B. The side extension parts 17, 18 are partially extended in FIG. 3, whereas FIG. 4 shows the completely extended operating position D of the spoiler element 12, i.e., the side extension parts 17, 18 are extended now completely in the transverse direction E-E of the vehicle and the spoiler device 11 has a greater transverse extent.

The second extraction movement of the spoiler element 12 in the transverse direction E-E of the vehicle may be accomplished pneumatically, hydraulically or by an electric motor or the like. In the resting position A, the two narrow sides extension parts 17, 18 are inserted almost completely into the wider central part 16 and only the two upright longitudinally directed bordering webs 19, 20 are situated outside the central part 16. However, no bordering webs 19, 20 need be provided on the extension parts 17, 18.

Figure 5:
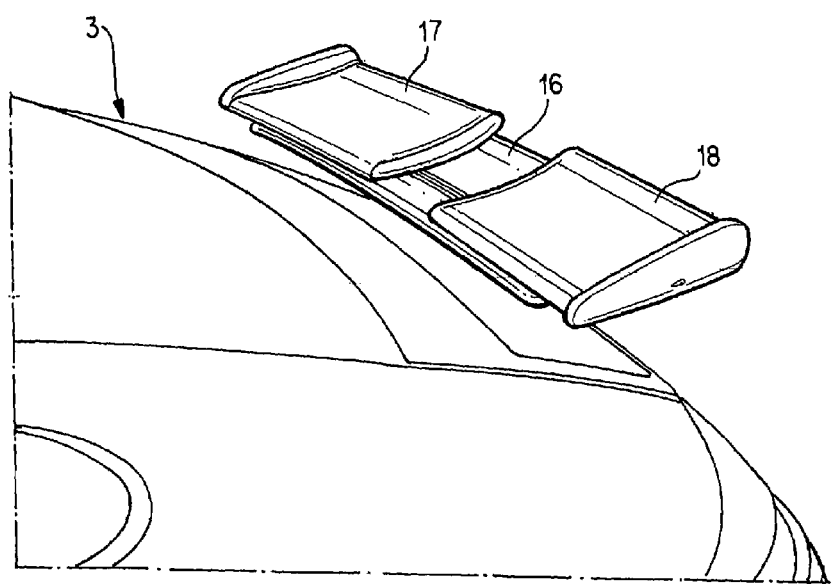
FIG. 5 shows a view similar to FIG. 4 of the completely extended operating position of a spoiler having extension parts located above a central part.

According to a second embodiment (shown in FIG. 5), the spoiler element 12 has two halves 17, 18 which in the retracted resting position A have each been pushed over a central means part 16 in some areas and area in contact with one another in the area of a central longitudinal plane H-H of the vehicle. In the completely extended operating position D, the central part extends between the halves that have been pushed apart.

Air inlet openings may be provided locally on the spoiler element 12 so that cool air can be directed to an internal combustion engine situated behind it.

In the inventive arrangement, the spoiler element 12 is moved from a resting position A in which it is flush with the outer skin into a raised intermediate position B by means of a first adjusting movement (pivoting or raising) and then there is a second adjusting movement of the spoiler element 12 in the transverse direction E-E of the vehicle into the extended operating position D.

In the extended operating position D the spoiler element 12 is widened on both transverse ends by a measure L by means of the two side extension parts 17, 18 on the two longitudinal sides.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A spoiler for a motor vehicle situated in a rear-end area of the vehicle, transverse to a longitudinal direction of the vehicle, comprising:

a spoiler element movable when fixed on the motor vehicle from a retracted resting position into an extended operating position, wherein the spoiler element in the extended operating position has a greater transverse extent than in the retracted resting position, the movable spoiler element comprises multiple transverse parts, at least individual parts of the spoiler element being transversely movable, the spoiler element has a central part and two transversely movable extension parts, when in the retracted resting position, the two transversely movable extension parts are positioned at least in part over the central part and are in mutual contact in the area of the longitudinal central plane of the vehicle, and the central part extends between the two transversely movable extension parts when in the extended operating position.

2. A spoiler for a motor vehicle situated in a rear-end area of the vehicle, transverse to a longitudinal direction of the vehicle, comprising:

a spoiler element movable when fixed on the motor vehicle from a retracted resting position into an extended operating position, wherein the spoiler element in the extended operating position has a greater transverse extent than in the retracted resting position, and wherein in the movable spoiler element comprises multiple transverse parts, including a center part having upper and lower exterior surfaces, at least individual parts of the spoiler element being transversely movable, and wherein when in the retracted resting position the movable transverse parts are stored over the upper exterior surface of the center part of the movable spoiler element.

3. A spoiler for a motor vehicle situated in a rear-end area of the vehicle, transverse to a longitudinal direction of the vehicle, comprising:

a spoiler element movable when fixed on the motor vehicle from a retracted resting position into an extended operating position, wherein the spoiler element in the extended operating position has a greater transverse extent than in the retracted resting position, and wherein in the movable spoiler element comprises multiple transverse parts, including a center part having upper and lower exterior surfaces, at least individual parts of the spoiler element being transversely movable, and wherein when in the retracted resting position, the movable transverse parts are stored under the lower exterior surface of the center part of the moveable spoiler element.

4. The spoiler as claimed in claim 3, wherein the movable spoiler element is formed by a rear spoiler.

5. The spoiler as claimed in claim 3, wherein the movable spoiler element is shaped as an airfoil wing.

6. The spoiler as claimed in claim 3, wherein the spoiler element has a central part and two transversely movable extension parts at transversely opposite ends of the central part.

7. The spoiler as claimed in claim 6, wherein the two transversely movable extension parts are arranged to move transversely by telescoping motion relative to the central part.

8. The spoiler as claimed in claim 6, wherein the two transversely movable extension parts are arranged to move into the central part in the retracted resting position.

* * * * *